US012667788B2

(12) United States Patent
Latypov et al.

(10) Patent No.: US 12,667,788 B2
(45) Date of Patent: Jun. 30, 2026

(54) COORDINATING A MULTI-PLAYER GAME

(71) Applicant: 360MusicS, Binghamton, NY (US)

(72) Inventors: Ray Latypov, Binghamton, NY (US); Nurali Latypov, Moscow (RU); Alfred Latypov, Binghamton, NY (US)

(73) Assignee: Ray Latypov

( * ) Notice: Subject to any disclaimer, the term of this patent is extended or adjusted under 35 U.S.C. 154(b) by 197 days.

(21) Appl. No.: 18/248,050

(22) PCT Filed: Oct. 4, 2021

(86) PCT No.: PCT/US2021/053388
§ 371 (c)(1),
(2) Date: Apr. 5, 2023

(87) PCT Pub. No.: WO2022/076315
PCT Pub. Date: Apr. 14, 2022

(65) Prior Publication Data
US 2023/0405472 A1      Dec. 21, 2023

Related U.S. Application Data

(60) Provisional application No. 63/198,237, filed on Oct. 5, 2020.

(51) Int. Cl.
*A63F 13/795*      (2014.01)
*A63F 13/35*      (2014.01)
(Continued)

(52) U.S. Cl.
CPC ............ *A63F 13/795* (2014.09); *A63F 13/35* (2014.09); *A63F 13/46* (2014.09); *A63F 13/798* (2014.09); *A63F 13/80* (2014.09)

(58) Field of Classification Search
CPC ........ A63F 13/795; A63F 13/35; A63F 13/46; A63F 13/798; A63F 13/80
(Continued)

(56) References Cited

U.S. PATENT DOCUMENTS 8,117,072 B2 *   2/2012   Kim ................... G06Q 30/0241
                                                                705/26.62
9,552,549 B1 *   1/2017   Gong ..................... G06N 3/045
(Continued)

FOREIGN PATENT DOCUMENTS

WO      WO-2013/067290 A1      5/2013

OTHER PUBLICATIONS

Slawski, Bill, "Rerank Search Results Another 10 Ways", SEO by the Sea, https://www.seobythesea.com/2010/06/another-10-ways-search-engines-may-rerank-search-results/, pp. 6-8, Navigational Queried, Jun. 7, 2010 (Year: 2010).*
(Continued)

*Primary Examiner* — Michael A Cuff
(74) *Attorney, Agent, or Firm* — MARSHALL, GERSTEIN & BORUN LLP

(57) ABSTRACT

A method in a computing system to facilitate a multi-player game by selecting a group of computing devices operated by respective users, distributing interactive content that includes one or more questions with a set of selectable answers to the group of computing devices, receiving a response to the one or more questions, determining a score based on whether the response is a correct response and a number of computing devices in the group from which the correct response was received, determining a respective ranking based at least on the corresponding score, and providing the respective ranking to each computing device in the group.

16 Claims, 5 Drawing Sheets

(51) Int. Cl.
    *A63F 13/46*       (2014.01)
    *A63F 13/798*     (2014.01)
    *A63F 13/80*      (2014.01)

(58) Field of Classification Search
    USPC ........................................................ 463/42
    See application file for complete search history.

(56) References Cited

U.S. PATENT DOCUMENTS

| | | | | |
|---|---|---|---|---|
| 10,552,002 | B1 * | 2/2020 | Maclean | ................ G06N 20/00 |
| 10,924,514 | B1 * | 2/2021 | Altman | .................... G06N 7/01 |
| 2002/0165630 | A1 * | 11/2002 | Arthur | ................. A63F 13/493 |
| | | | | 700/91 |
| 2007/0033107 | A1 | 2/2007 | Ubale et al. | |
| 2014/0272900 | A1 | 9/2014 | Mellett et al. | |
| 2016/0078014 | A1 * | 3/2016 | Avasarala | ............ G06F 40/169 |
| | | | | 704/9 |
| 2017/0364792 | A1 * | 12/2017 | Chai | ...................... G06N 3/044 |
| 2020/0078687 | A1 | 3/2020 | Lynch et al. | |
| 2020/0179811 | A1 | 6/2020 | Amaitis et al. | |
| 2025/0084154 | A1 * | 3/2025 | Van Es | ................. C07K 16/18 |

OTHER PUBLICATIONS

International Search Report and Written Opinion for Application No. PCT/US2021/053388, dated Jan. 26, 2022.

* cited by examiner

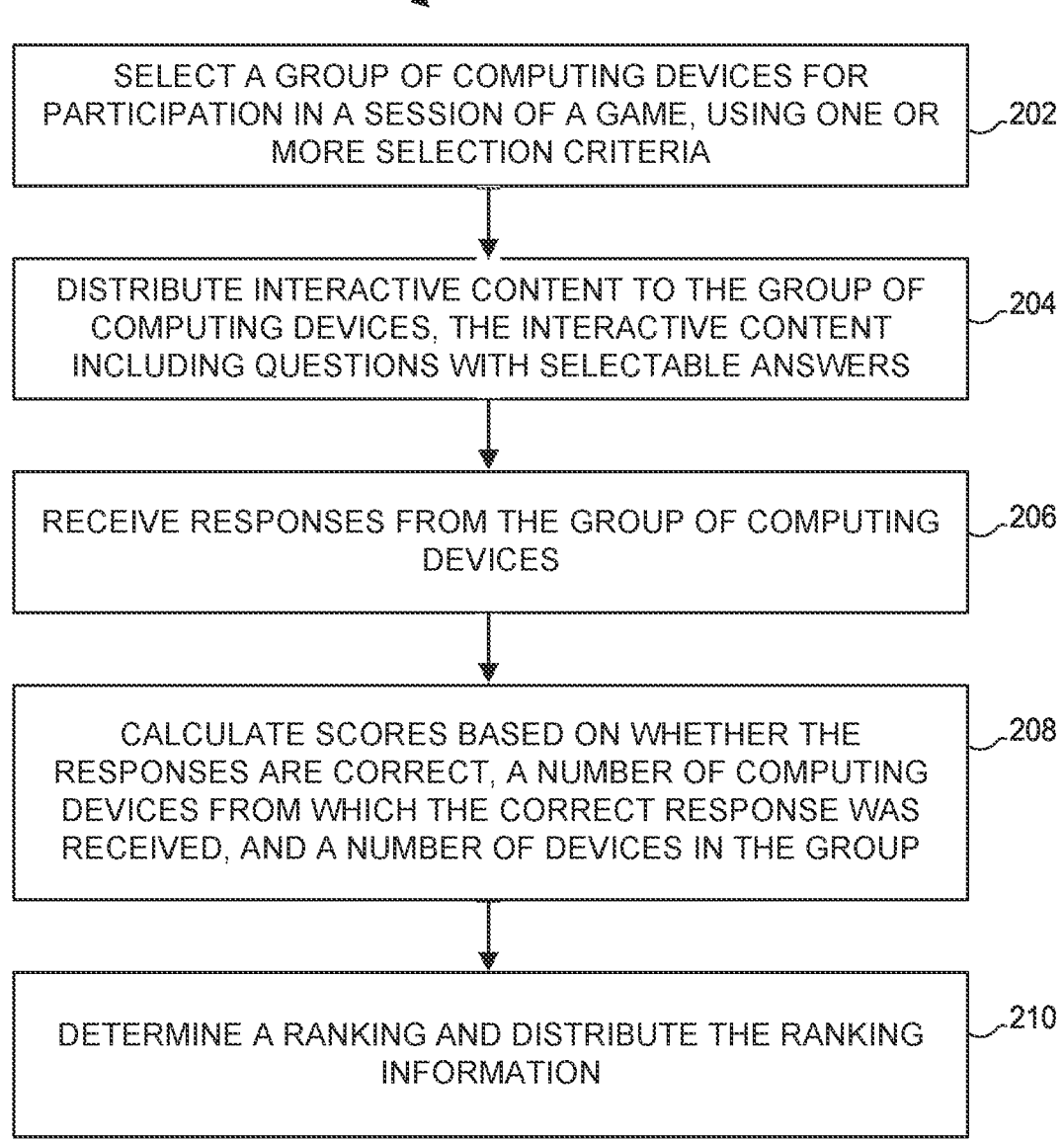

200

SELECT A GROUP OF COMPUTING DEVICES FOR PARTICIPATION IN A SESSION OF A GAME, USING ONE OR MORE SELECTION CRITERIA ⟍202

DISTRIBUTE INTERACTIVE CONTENT TO THE GROUP OF COMPUTING DEVICES, THE INTERACTIVE CONTENT INCLUDING QUESTIONS WITH SELECTABLE ANSWERS ⟍204

RECEIVE RESPONSES FROM THE GROUP OF COMPUTING DEVICES ⟍206

CALCULATE SCORES BASED ON WHETHER THE RESPONSES ARE CORRECT, A NUMBER OF COMPUTING DEVICES FROM WHICH THE CORRECT RESPONSE WAS RECEIVED, AND A NUMBER OF DEVICES IN THE GROUP ⟍208

DETERMINE A RANKING AND DISTRIBUTE THE RANKING INFORMATION ⟍210

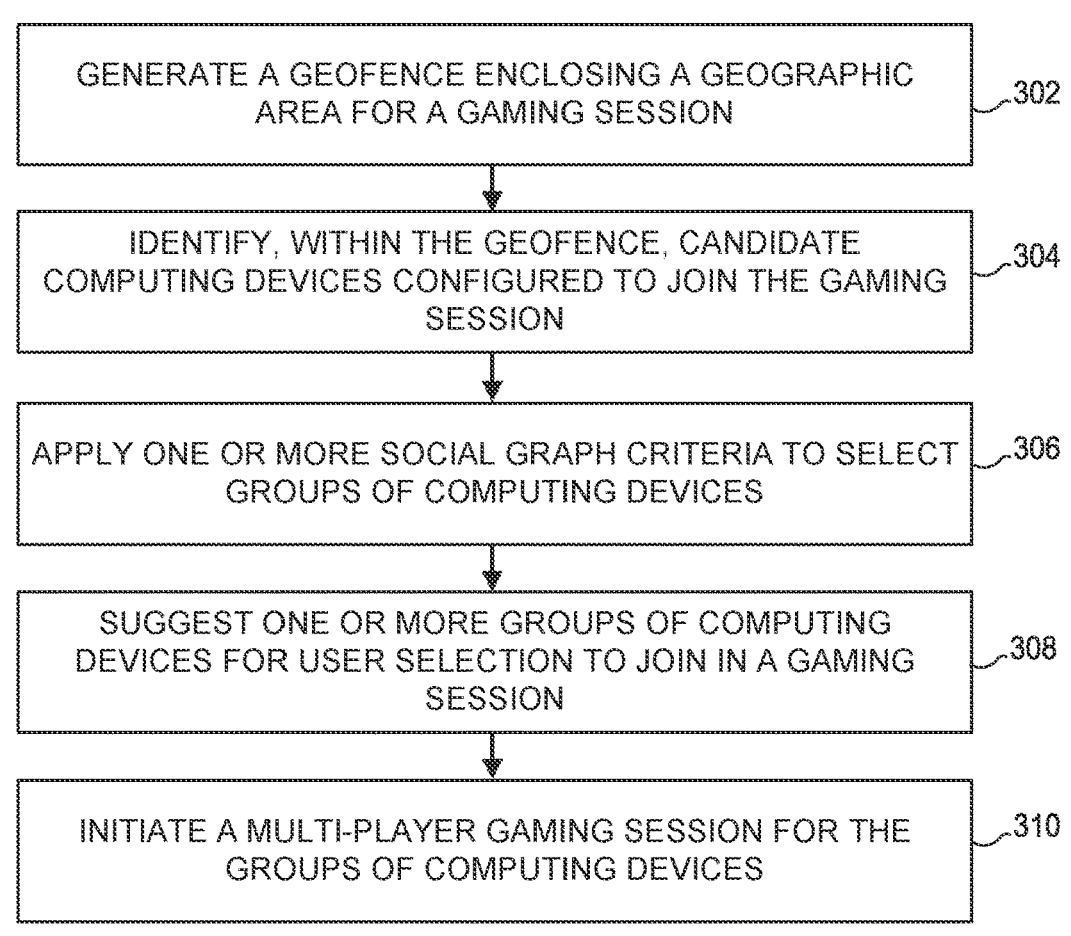

| GENERATE A GEOFENCE ENCLOSING A GEOGRAPHIC AREA FOR A GAMING SESSION | 302 |

IDENTIFY, WITHIN THE GEOFENCE, CANDIDATE COMPUTING DEVICES CONFIGURED TO JOIN THE GAMING SESSION — 304

APPLY ONE OR MORE SOCIAL GRAPH CRITERIA TO SELECT GROUPS OF COMPUTING DEVICES — 306

SUGGEST ONE OR MORE GROUPS OF COMPUTING DEVICES FOR USER SELECTION TO JOIN IN A GAMING SESSION — 308

INITIATE A MULTI-PLAYER GAMING SESSION FOR THE GROUPS OF COMPUTING DEVICES — 310

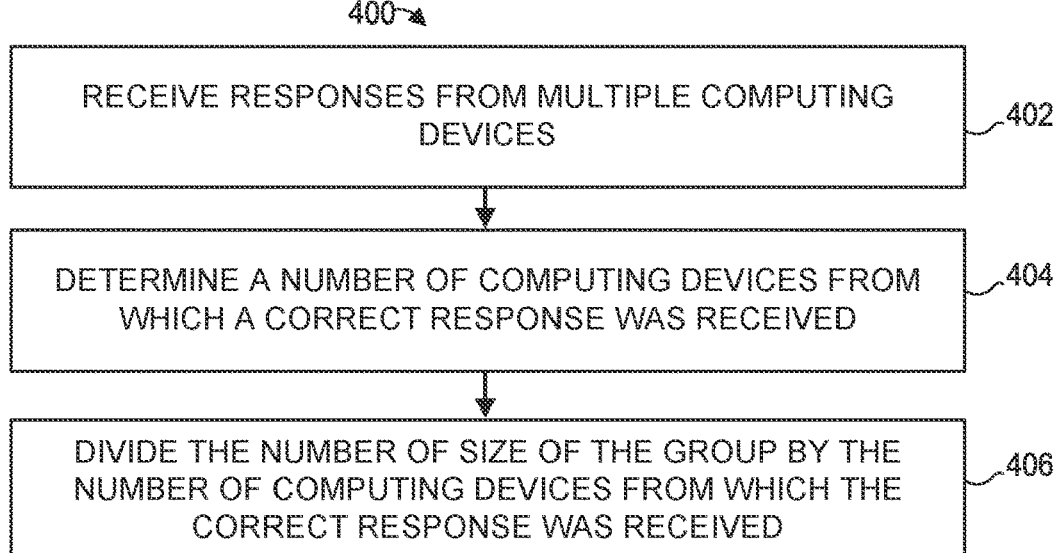

RECEIVE RESPONSES FROM MULTIPLE COMPUTING DEVICES — 402

DETERMINE A NUMBER OF COMPUTING DEVICES FROM WHICH A CORRECT RESPONSE WAS RECEIVED — 404

DIVIDE THE NUMBER OF SIZE OF THE GROUP BY THE NUMBER OF COMPUTING DEVICES FROM WHICH THE CORRECT RESPONSE WAS RECEIVED — 406

*FIG. 4*

COORDINATING A MULTI-PLAYER GAME

CROSS REFERENCE TO RELATED APPLICATION

This application claims the benefit under 35 U.S.C. § 119(e) of U.S. provisional patent application Ser. No. 63/198,237, filed Oct. 5, 2020, the entire disclosure of which is incorporated herein by reference.

FIELD OF THE DISCLOSURE

This disclosure generally relates to online multi-player games and, more particularly, to formation of an individual gaming session and ranking of the participants.

BACKGROUND

Today, many users participate in multi-player online network games, some of which are based on answering trivia questions. These games are offered in different formats, for example single-player or multi-player card games, online single-player games, and online multi-player games. There are also trivia game TV shows, where audiences can observe a contest between selected few players or teams of players, who complete in-person in a video recording studio. However, none of the known trivia games combine different formats of interaction. A viewer of a TV game show cannot join the contest remotely and compete with the players in the studio. Similarly, one cannot watch the progress of an online multi-player game without participation. Another undesirable aspect of multi-player trivia games is that sometimes these games produce many winners, and sometimes no winners at all.

SUMMARY

An example embodiment of the techniques of this disclosure is a method in a computing system for facilitating a multi-player game play. The method is implemented by processing hardware and includes selecting a group of computing devices based on at least one selection criterion, each of the computing devices operated by a respective user; distributing, via a communication network to the group of computing devices, interactive content that includes one or more questions with a set of selectable answers; receiving, from the group of computing devices, a respective response to the one or more questions; determining, for each response, a score based on (i) whether the response is a correct response and (ii) a number of computing devices in the group from which the correct response was received; determining a respective ranking based at least on the corresponding score; and providing the respective ranking to each computing device in the group.

BRIEF DESCRIPTION OF THE DRAWINGS

FIG. 2 is a flow diagram of an example method for conducting an online multi-player game based on trivia questions, which can be implemented in the system of FIG. 1.

FIG. 3 is a flow diagram for forming a group of participants in the online multi-player game, which can be implemented in the system of FIG. 1.

FIG. 4 is a flow diagram for determining a coefficient of difficulty of a question to generate scores for the participants, which can be implemented in the system of FIG. 1.

DETAILED DESCRIPTION

The disclosed systems and methods generally relate to improving the operation and user experience in multi-player trivia video games. The systems and methods achieve these improvements by coordinating a game between online and live players in a studio-recorded game show, providing an improved scoring system, and enhancing video recording techniques of the in-studio players as well as users who join online. Additionally, the disclosed systems allow to dynamically suggest and create sub-groups among the online users within the game based on different criteria, such as, for example, user geographic proximity.

In this disclosure, the terms "user," "player," and "participant" may be used interchangeably to refer to an individual participating in a multi-player game.

Figure 1:
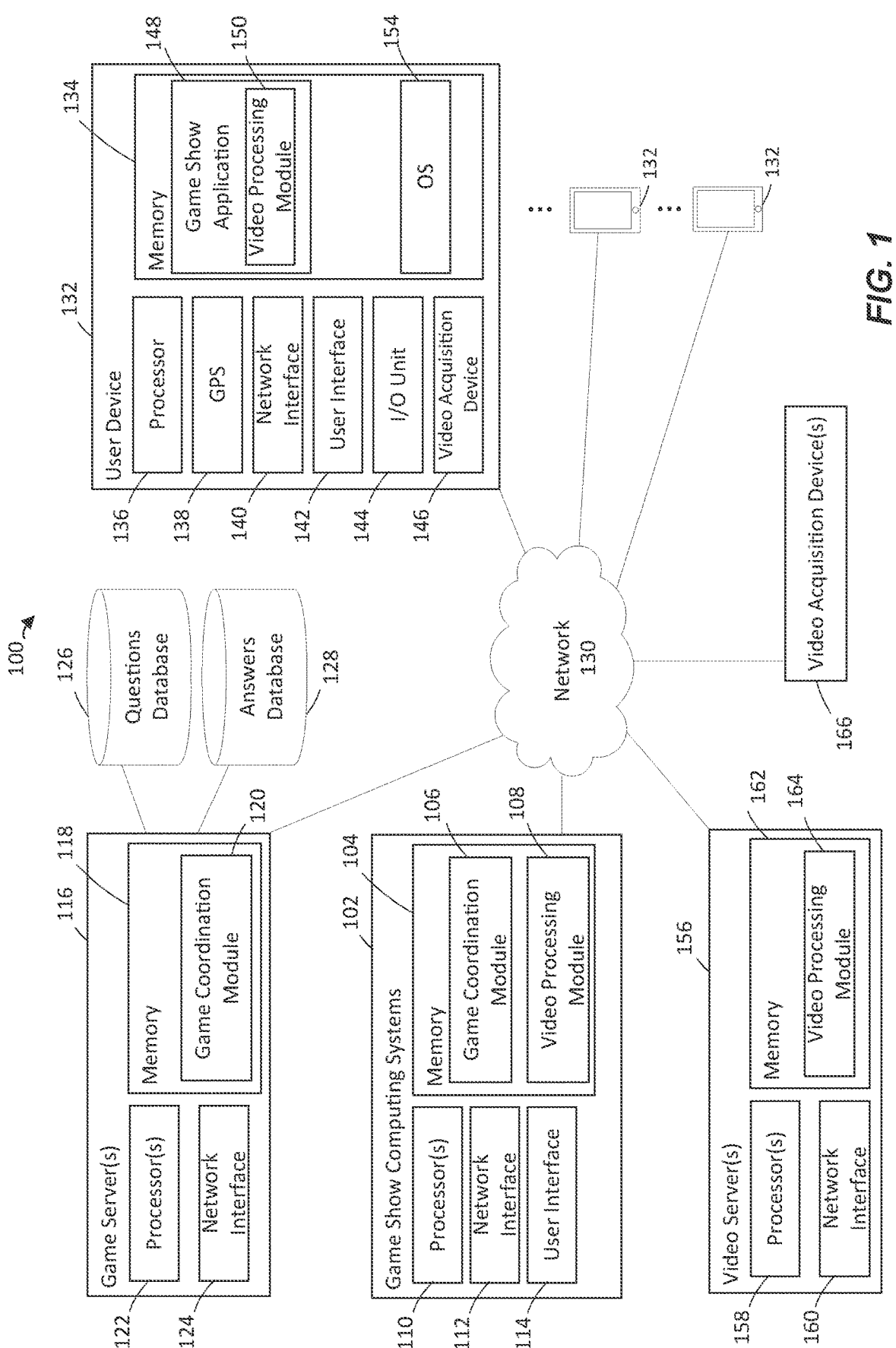
FIG. 1 illustrates a block diagram of an example system in which the techniques of this disclosure for coordinating a game between online and in-studio players and improving efficiency of multi-player trivia games can be implemented.

FIG. 1 is a simplified block diagram of an example system 100 for coordinating a game between online and in-person users in a studio game show. The system 100 includes game show computing systems 102 communicatively coupled to user devices 132, game server(s) 116, video server(s) 156, and video acquisition devices 166 via a network 130. The one or more networks 130 may be a single communication and/or data network, or may include multiple communication and/or data networks (e.g., one or more wired and/or wireless local area networks (LANs), one or more wired and/or wireless wide area networks (WANs), which may include the Internet), one or more public and/or private networks, and/or one or more other types of networks.

In an embodiment, the system 100 coordinates a game between in-studio users (not shown) and remote users (not shown) via the network 130, where the remote users interact with the game via the user devices 132, and the in-studio users interact with the game via the game show computing systems 102. The system enables a game play between online and in-person users, where some viewers of a TV game show can become active participants, and other viewers can watch the progress of a massive multi-player trivia game without active participation. Here, a studio may be a TV studio, or any space where video productions may take place.

The game show computing systems 102 may include one or more processors 110 and one or more tangible, non-transitory memories, memory storage devices, or data storage units 104. Each of the one or more processors 110 may be a programmable microprocessor that executes computer-executable instructions stored in the one or more memories 104 to execute some or all of the functions of the game show computing systems 102. Processor(s) 110 may include one or more central processing units (CPUs) and/or one or more graphics processing units (GPUs), for example. Alternatively, or in addition, some of the processors 110 may be other types of processors (e.g., application-specific integrated circuits (ASICs), field-programmable gate arrays (FPGAs), etc.). In embodiments, the one or more game show computing systems 102 may be a local computing system, and some of the functionality of the computing system may instead be implemented in hardware.

The game show computing systems can include a network interface 112 and a user interface 114. The one or more memories 104 may include one or more tangible, non-transitory memory storage devices or components, and may store a game coordination module 106 and a video processing module 108. The one or more memories 104 may include a set of computer-executable instructions that are executable by the one or more processors 110 to cause the game show computing systems 102 to receive and process or send game operations.

The game coordination module 106 may include a set of computer-executable instructions that are executable by the one or more processors 110 to cause the game show computing system 102 to perform certain transactions pertaining to game play operations, including but not limited to user registration, geofencing (i.e., determining whether a user is within a certain virtual geographic perimeter), selecting and transmitting questions, receiving user responses, analyzing user responses, calculating scores, and keeping and displaying scores for the users. For example, the game show computing system 102 may send game play instructions, queries, or requests, or perform any other suitable actions to studio players and/or receive instructions, queries, requests, or input from the studio users via user interface 114. Additionally or alternatively, the game show computing system 102 may send and/or receive game play instructions, queries, requests, or perform any other suitable transactions via the network interface 114 and the network 130 from/to the user devices 132 of the remote users.

The video processing module 108 of memory 104 may include a set of computer-executable instructions that are executable by the one or more processors 110 to cause the game show computing system 102 to perform certain operations pertaining to acquiring, processing and broadcasting video stream received from the video acquisition device or devices 166.

The network interface 112 can include one or more communication interfaces such as hardware, software, and/or firmware for enabling communications via a cellular network, a WiFi network, or any other suitable network such as the network 130. The user interface 114 can include one or more input devices configured to receive user commands, such as a touchscreen, a keyboard, a microphone, a camera, etc. and one or more output devices configured to provide visual, audio, and/or tactile output, such as touchscreen or a speaker.

In some arrangements of the system 100, the game show computing systems 102 are communicatively coupled to one or more game servers 116, e.g., via the one or more communication and/or data networks 130. The game server(s) 116 may be located remotely from any of the local computing systems 102 of the system 100, or may be local servers. The game server(s) 116 may include one or more processors 122, a network interface 124, and a tangible, non-transitory memory, memory storage device, or data storage unit 118. In embodiments, the one or more game server(s) 116 may be implemented as a bank of servers, a virtual private network or computing devices, a cloud computing system, or any other suitable implementation. In an example embodiment, the memory 118 of the game server(s) 116 store a game coordination module 120. In this example embodiment, the game coordination module 120 is an instance of the game coordination module 106, which can be implemented, for example, in a purely online version of the game, without the coordination with an in-studio game show.

The memory 118 stores instructions executable on the processor(s) 122, which can access a questions database 126 and an answers database 128. The questions database 126 serves as a repository of all the questions available for a game, along with their correct answers and several incorrect solutions (for example, 2, 3, or 4, etc.) for a multiple choice selection (also referred to as an "answer set"). In an embodiment, the game coordination module 120 includes a set of computer-executable instructions that are executable by the one or more processors 122 to retrieve a question and its answer set from the questions database 126. The questions database 126 may also include data on the previously used questions from past games. In an example embodiment, the processor(s) 122 receive questions and their corresponding answer sets from, for example, game organizers, game sponsors, or from the public (i.e., game users, in-studio participants, game show observers, or any person or entity who would like to submit a question with an answer set). The processor(s) 122 populate the questions database 126 with the accepted questions and their corresponding answer sets. The system 100 may reward the accepted questions from the public. In an embodiment, the system 100 calculates a monetary reward based on the determined question difficulty coefficient, discussed later with reference to FIG. 4. The reward may be generated as a value linearly dependent on the question difficulty coefficient, such as, for example, a predetermined minimal value (e.g., 10, 50, or 100 monetary units) multiplied by the question difficulty coefficient. Alternatively, the reward by be generated as a value exponentially dependent on the question difficulty coefficient, where, for example, a predetermined minimal value (e.g., 10, 50, or 100 monetary units—any value greater than 1) is a base raised to the power of the question difficulty coefficient. The reward for accepted questions may be an invitation to participate in a game as an in-studio participant.

The database 128 contains user data such as the user's statistics, the user's association with one or more groups for multi-player sessions, the user's preference related to trivia topics, etc. The database 128 also stores questions along with selectable answers. For each question, the database 128 can store additional information such as the number of people who answered the question correctly, an assessment of the difficulty of the question (e.g., the ratio of attempted answers to correct answers), a category of the question, etc. Further, the database 128 in some implementations stores assessments of difficulty of the question for separate geographic locations, categories of users, etc. The processor(s) 122 may access the answers database to fulfill requests on metrics and analytics on the past players' performance.

The user devices 132 can be any suitable electronic devices (here, 132A-C) used by remote users to join the game, such as a smartphone, a tablet, a laptop, a desktop computer, a wearable device such as a smart watch, smart glasses, a smart ring, or any other suitable computing device. In an example embodiment, some of the user devices 132 may be proprietary devices configured to access the game. Each remote user may use any of the above mentioned different types of user devices. In an embodiment, an example user device 132A can include processing hardware such as one or more processors (CPUs) 136 and a computer-readable non-transient memory 134 storing instructions which the one or more processors 136 can execute. The user device 132A also can include a global positioning system (GPS) 138 or any other suitable positioning module, a network interface 140, a user interface 142, and input/output (I/O) unit 144, and an video acquisition device 146. The user device 132A may also include components not shown in FIG. 1, such as a graphics processing unit (GPU).

The user device memory 134 may include one or more tangible, non-transitory memory storage devices or components, such as random access memory (RAM), read-only memory (ROM), flash memory, other types of persistent memory, etc. The memory 134 may store a set of computer-executable instructions that are executable by the one or more processors 136. The memory 134 also stores an operating system (OS) 154, which can be any suitable mobile or general-purpose OS. In addition, the memory can store one or more applications that communicate data via the network 130, for example the game show application 148. Communicating the data can include receiving data, transmitting data, or both via a wired, wireless, or optical connection. The game show application 148 may include a video processing module 150, communicating with the image acquisition device 146. The OS 154 may include application programming interface (API) functions that allow applications to access information from the GPS module 138 or other components of the user device 102. For example, the game show application 148 can include instructions that invoke an OS 154 API for retrieving a current geographic location of the user device 132A.

Users may join an online trivia game via a game show application 148. The game show application 148 generally can be provided in different versions for different respective operating systems. For example, the maker of the user device 132A can provide a Software Development Kit (SDK) including the game show application 148 for the Android™ platform, another SDK for the iOS™ platform, etc. In alternative embodiments, remote users may join the game by accessing a website or through social media via network 130. Users may also join via any other suitable network or telecommunication means with the aid of any electronic device capable of interfacing with the game show computing systems 102 or game server(s) 116.

In an embodiment, the game show computing system 102 receive a registration request from the user device 132A via network 130. The registration information may contain user legal name or a username, age, preferred language, location, etc. The remote player user device 132A may submit a request to download a game show application 148.

The game show application 148 may retrieve a geographic location of the user device 132A from the GPS module 138 and transmit this information to the game coordination module 106 of the game show computing systems 102. The game show computing systems 102 may use the retrieved geographic location to identify candidate computing devices, such as the user device 132A to select groups of computing devices based on one or more social graph criteria, as discussed below with reference to FIG. 3.

In one embodiment of the system 100, the game show computing systems 102 are communicatively coupled to the video acquisition devices 166. The video acquisition devices 166 will be described in detail later in the specification with reference to FIGS. 5-8.

In some arrangements of the system 100, the game show computing systems 102 are communicatively coupled to one or more video servers 156, e.g., via the one or more communication and/or data networks 130. The video server(s) 156 may be located remotely from any of the local computing systems 102 of the system 100, or may be local servers. The video server(s) 156 may include one or more processors 158, a network interface 160, and a tangible, non-transitory memory, memory storage device, or data storage unit 162. In embodiments, the one or more video server(s) 156 may be implemented as a bank of servers, a virtual private network or computing devices, a cloud computing system, or any other suitable implementation. In an example embodiment, the memory 162 of the video server(s) 156 store a video processing module 164. In this example embodiment, the video processing module 164 is an instance of the video processing module 108, which can be implemented, for example, in a purely online version of the game, storing instructions for processing video feed of online users playing remotely. The video processing module 164 will be described in greater detail later in the specification.

FIG. 2 illustrates a flow diagram of an example method 200 for coordinating a multi-player trivia video game play between in-studio and online user computing devices. In an embodiment, at least a portion of the method 200 is performed by the system 100, or by other suitable systems. For example, at least portions of the method 200 may be performed by the processor 110 of the game show computing systems 102 (e.g., by utilizing the game coordination module 106) and/or by the processor 122 of the game server(s) 116 (e.g., by utilizing the game coordination module 120). In embodiments, the method 200 may include additional or alternate steps other than those discussed with reference to FIG. 2. The method 200 is discussed with simultaneous reference to FIGS. 1, 3, and 4, although this is for ease of illustration purposes only.

In one embodiment, at block 202, the method 200 includes selecting, by one or more processors, a group of computing devices for participation in a session of a game, using one or more selection criteria. At block 202, the method 200 may include selecting game show computing systems 102 as computing devices associated with in-studio users. The computing devices may be computing devices of users joining the game remotely, each using a computing device such as the user device 132A. The user device 132A may be any compatible electronic device such as a smartphone, a tablet, a laptop, a desktop computer, a pager, a wearable device such as a smart watch, smart glasses, a smart ring, or a proprietary device configured to access an online trivia game. The selection criteria may include user registration via the user device 132A, where only users registered with the game platform may be selected to participate in the game. Game registration may include installing the game show application 148 on the user device 132A, or selecting devices with a compatible operating system. The registration may include a user providing information such as user legal name, user preferred game name, age, gender, preferred language, education level, geographical location, etc. The one or more processors may further group the registered user devices 132 according to additional selection criteria, discussed below with reference to FIG. 3.

In an example embodiment, the one or more processors may select in-studio game participants from a pool of remote online users of previous game sessions. The selection criteria may be based on a cumulative rank or a cumulative score of a remote user in a previous game session or sessions, compared to other remote users, or compared to the combined cohort of remote and in-studio users. For example, the one or more processors may select users with the highest rank in a past game session, or the top 3 ranked users, or top 10, etc. Alternatively, the one or more processors may select users with cumulative scores above a certain threshold. The selection criteria may require a remote user to rank or score above a certain threshold in a predetermined minimum number of game sessions (for example, at least 2, 3, or 5 gaming sessions). Selection for an in-studio game participation may be the reward or one of the rewards for the winners of the online game version. The top-scoring in-studio participants may be selected for a future in-studio game session. The selection criteria may be based on a cumulative rank or a cumulative score of an in-studio user in a previous game session or sessions, compared to other in-studio users, or compared to the combined cohort of remote and in-studio users. The one or more processors may apply the same selection criteria as applied to selecting in-studio players from the pool of remote users, or may utilize different criteria.

FIG. 3 illustrates a flow diagram of an example method 300 for forming a group of computing devices in the online multi-player game. In an embodiment, at least a portion of the method 300 is implemented in the system 100, or in other suitable systems. For example, at least portions of the method 300 are performed by the processor 110 of the game show computing systems 102 (e.g., by utilizing the game coordination module 106) and/or by the processor 122 of the game server(s) 116 (e.g., by utilizing the game coordination module 120). In embodiments, the method 300 includes additional or alternate steps other than those discussed with reference to FIG. 3. The method 300 is discussed with simultaneous reference to FIGS. 1 and 2, although this is for ease of illustration purposes only.

At block 302, the method 300 may include generating, by the one or more processors, a geofence enclosing a geographic area for a gaming session, where geofence is a virtual geographic perimeter.

At block 304, the method 300 may identify, by the one or more processors, within the geofence, candidate computing devices configured to join the gaming session. The one or more processors may identify geographic location of the registered remote user devices 132 and determine whether the geographic location is within the geofence. Users may provide geographic location data upon game registration, or the game show application 148 may access the GPS module of the user devices 132 and retrieve latitude and altitude of a user computing device. A user may be in motion while accessing the multi-player game play, in this case the game show application 148 may retrieve the geographic location of the user at time of registration, or prompt the user to select a preferred geographic location within a suggested geographic perimeter.

At block 306, the method 300 may apply, by the one or more processors, one or more social graph criteria to select groups of computing devices. The one or more processors may apply clustering criteria to the user devices 132 within the generated geofence. The clustering criteria may be based, for example, on geographic proximity of a critical number of the user devices 132 within the generated geofence. Based on the social graph criteria, the one or more processors may select groups of user computing devices based on neighborhoods, cities, states, regions, countries, or continents, etc. The groups may nest within groups, for example, the one or more processors may select a group of same computing devices within a city group, and the group of same computing devices within a country group. On a smaller scale, the one or more processors may detect a number of computing devices within very close proximity, such as a bar, or a personal residence, and apply a geofence to select the computing devices within close proximity as one group.

The one or more processors may use other criteria to suggest player sub-grouping. For example, the one or more processors may use data from user profiles to select a group from among a set of candidate user devices. For example, alternative social graph criteria for selecting groups of computing devices may be based on user age, academic degree level, areas of expertise, marital status, etc.

In an embodiment, at block 308, the method 300 includes suggesting, by the one or more processors, one or more groups of computing devices for user selection, to join in a gaming session. A user, via the user interface 142 of the user device 132A, may choose to join one group, any combination of groups, or all of the suggested groups of computing devices in a gaming session. For a user computing device that participates in one or more groups within a gaming session, the one or more processors will calculate the user cumulative score within each group according to the method 400 discussed below, and will determine the user's ranking within each group based on their cumulative score within each respective group, according to a step with reference to block 210, discussed below.

In an embodiment, additionally or alternatively to the dynamic suggestion of forming groups of computing devices by the system 300, the users may choose to form groups with other users according to their own preferences. For forming such affiliation groups, users may or may not be within a geofenced location, or may or may not be affiliated through their user profiles. For example, friends, family members, or colleagues from different geographical locations may choose to form a group in a multi-player gaming session.

At block 310, the method 300 includes initiating, by the one or more processors, a multi-player gaming session for the groups of computing devices.

Referring back to FIG. 2, at block 204, the method 200 includes distributing, by one or more processors, interactive content to the group of computing devices, the interactive content including questions with selectable answers. The one or more processors may distribute the interactive content to the remote user devices 132, associated with remote users, and the game show computing systems 102, associated with in-studio users. Each computing device receives the same interactive content in the form of a question or a task, the same selection of possible answers, or an answer set. The answer set may include one or more correct answers to the question or the task, and one or more (for example, 2, 3, 4, etc.) incorrect answers to the question or the task. The question or the task may be in a format of text, number(s), video, picture, audio, or any combination of the possible formats.

At block 206, the method 200 includes receiving, by one or more processors, responses from the group of computing devices. The one or more processors may receive responses from the user devices 132 associated with the remote users and the game show computing systems 102 as devices associated with in-studio users. The responses may be a selection of one or more answers from the answer set. In an embodiment, the answers may be provided in a format of a written answer, in audio, video, or picture format, etc.

In an embodiment, at block 208, the method 200 includes calculating, by one or more processors, scores based on whether the responses are correct, a number of other computing devices from which the correct response was received, and the number of computing devices of the group. At this step, the one or more processors executes computer-executable instructions to determine whether a particular received response corresponds to a correct or an incorrect response. Upon a completed determination, the one or more processors calculate a score for the particular response. An incorrect response receives a score of zero, and a correct response receives a score that depends on the number of other devices from which the correct response was received and the number of computing devices in the group. An example method 400 for calculating scores for correct responses to particular questions is described below with reference to FIG. 4. The one or more processors adds the calculated score for the correct response to the cumulative score of the user devices associated with the users who submitted correct responses. The computing devices associated with the users who submitted incorrect responses do not receive any score increase to their cumulative score.

FIG. 4 illustrates a flow diagram of the example method 400 for calculating scores for correct responses to particular questions. In an embodiment, at least a portion of the method 400 is performed by the system 100, or by other suitable systems. For example, at least portions of the method 400 are performed by the processor 110 of the game show computing systems 102 (e.g., by utilizing the game coordination module 106) and/or by the processor 122 of the game server(s) 116 (e.g., by utilizing the game coordination module 120). In embodiments, the method 400 includes additional or alternate steps other than those discussed with reference to FIG. 4. The method 400 is discussed with simultaneous reference to FIGS. 1 and 2, although this is for ease of illustration purposes only.

At block 402, the method 400 receives, by the one or more processors, responses from multiple computing devices. Analogously to the process at block 206, the one or more processors may receive responses from the user devices 132 associated with the remote users and the game show computing systems 102 as devices associated with in-studio users. At block 404, the method 400 determines, by the one or more processors, a number of computing devices from which a correct answer was received.

At block 406, the method 400 divides, by the one or more processors, the number of size of the group by the number of computing devices from which the correct response was received:

$$S\_i=X\_i/Y\_i \tag{Eq. 1}$$

In an embodiment, the calculated score Si for a particular question is a ratio of the number of computing devices in a group Xi and the number of computing devices from which the one or more processors received a correct response Yi. In an alternative embodiment, the score Si may be used as a weighting coefficient for a score of a set number of points, where Si may be used as the coefficient of difficulty of a particular question for a particular group of users. The presented scoring method 400 allows to iteratively calculate the difficulty of each question during play, the difficulty being defined by how challenging is each particular question for a particular group of users associated with a group of computing devices Xi. In a scenario where no computing devices provided a correct response, in order to avoid division by zero, the score Si may be automatically assigned to zero.

The one or more processors may use the resultant score obtained at block 406 to add the resultant score to the running scores of the devices of users who provided a correct response for the particular question. Users who did not answer the particular question correctly do not get any points added to their current score. In an embodiment, Xi can be a number of users who attempted to answer the particular question (selected or submitted a response), which may be less than the total number of registered users, or users within a selected group of computing devices. The users who did not attempt or did not have the time to select or submit an answer for the particular question would receive a score of zero, or no points for the particular question, just as the users who provided an incorrect response to the particular question.

Alternatively, a correct response to a question may be determined as a set score, for example a set number of points (for example, one point for each correct response). However, such method does not account for the particular question difficulty for a group of users who attempted to answer the question. The scoring system that assigns the same score for a correct response to each question sets up for a "one strike you're out" game condition: the players who provide a correct response to a question gain a point and move on to the next question, but those who provide an incorrect response get eliminated from the game. There is no opportunity for a user to recover any points not gained for incorrect responses, since there is no additional reward for answering more difficult questions later in the contest. At the end, only players who have answered all the questions correctly remain in the game and are determined as winners.

Another disadvantage of using a scoring system where each question is scored equally is that such a scoring system may result in either no game winners, or a large number of winners. This condition limits the type of game prizes only to those that can be split equally between the multiple winners. This issue occurs because such a scoring system allows for only a very narrow distribution of scores, which equals the amount of questions plus one:

$$X=n+1 \tag{Eq. 2}$$

where X is the number of different scores at the end of the game, and n is the amount of game questions. For example, in a game with 12 questions, where for each correctly answered question a player receives one point, there can be a maximum of 13 possible scores: from zero (all questions answered incorrectly) to 12 (all questions answered correctly).

Alternatively, each question may be assigned a difficulty coefficient, or a weighting coefficient before the game, for example by game organizers or question authors. The predetermined question weighting coefficient may be stored on memory 104 or memory 118, and a set score for a correct response to each question may be further adjusted (for example, multiplied), by the one or more processors, by such a weighting coefficient. For example, weighting coefficients may be integers, decimal numbers, or rational numbers greater than zero; they may be bound by a range, or may not be bound by a range. However, this is also not an optimal method for calculating scores for correct responses to particular questions, because the scores for correct responses will not reflect the particular question difficulty for a particular group of users. Different groups of users may be challenged by different types of questions. For example, same questions might present varying degrees of difficulty to different age groups.

The proposed scoring method 400 allows for a much greater distribution of the users' scores relative to each other's performance than offered by the traditional trivia game scoring methods: the amount of available score values for a group of contestants can increase exponentially relative to the number of questions:

$$Z=2n \tag{Eq. 3}$$

where Z is the total number of available score values in a game with n total number of questions in the game. For example, in a game with 12 questions, at the end of the game there is a theoretical possibility for an number of 4096 different scores, and in a game with 20 questions, this number increases to 1048576 of total available different scores. Two or more players might have matching scores if they answer the same set of questions correctly and miss the same questions.

Another benefit of the scoring method 400 is providing the players a chance to win in the game even after they provide an incorrect answer to a question. The proposed scoring method 400 enables users to recover their score with correct responses to later questions that presented as challenging for the group of players and received a high number of points. A correct response to a question that was determined as difficult for a group of players will significantly advance the cumulative score of the players who answered it correctly. Alternatively, if a player maintained a relatively high score prior to missing a question, their score might not suffer significantly if they miss a question determined as easy for the group of players, and thus assigned a low score.

In a game with a scoring method that assigns an equal amount of points to each correct answer, a player who misses a question or joins the game late has no opportunities to catch up with the leading players who have not yet missed any questions. Therefore, the disclosed scoring method 400 provides a chance and incentive for every player to compete until the end of the game, because it offers every contestant an opportunity to become a score leader at any point in the game by fairly comparing their knowledge, critical thinking skills, and reaction against the cohort of players on all the questions. If every player is motivated to stay in the game until the end, this increases potential revenue from sponsors and advertisement.

Utilizing the scoring method 400 in a trivia game also may allow for players to join the game after it has started. Additionally, the scoring method 400 may be applied to an open-ended online game with no time or session limit, which a user could join at any time and for any duration. Here, each user's score would be calculated for the amount of attempted questions relative to the users who played the same questions.

In some implementations, the one or more processors of the system 100 can utilize the determined coefficients of question difficulty to automatically select subsequent game questions and steer the game towards easier or more difficult questions for a particular group of players. These one or more processors may execute instructions in response to, for example, the running distribution of the players' scores, the number of score leaders, and the proximity of the end of the game. The goal may be, for example, to limit the number of winners by separating the scores of the top players with identical cumulative scores. For example, this may be achieved by the one or more processors selecting a successive question from one of the question groups determined as challenging for a particular sub-set of players. If the received answers do not provide a desired degree of distribution for the new cumulative scores, the system would select a successive question from a different question group that generated a high difficulty coefficient. If the resulting distribution of scores shows distinct leaders, and the game is early in session, the system might select a question from an easier category for the particular cohort, to indulge the players in easy winnings. The system for automatically choosing categories and levels of difficulty of the successive questions may employ one or more trained machine learning models, deep learning models, neural networks, trained artificial intelligence models, and/or other suitable models. The model may be generated by performing one or more statistical analyses on historical game data.

The described scoring method 400 provides additional metrics for providing monitoring and analytics. As stated earlier, the coefficient of question difficulty provides a value of question difficulty for each particular group of players. Since the same question may be valued differently for different groups of players, the question difficulty value represents average knowledge of each player within the group. Thus, it is possible to compare the difficulty of a certain question or task between different groups, even if they differ in the number of players. It is further possible to evaluate and compare coefficients of question difficulty between sub-groups within the groups of players. These comparisons can be made during the game and displayed on the scoreboard along with the other statistics, or they can be performed after the game conclusion.

The one or more processors may utilize the metrics of group question difficulty and individual players scores to automatically suggest optimal teams of players for future contests. For example, the system may suggest a team of players with knowledge in similar areas, or teams of players whose knowledge is spread over many different areas. Such a system may detect strong and weak areas in the knowledge of each individual player, as well as strong and weak areas of groups of players. Returning players may receive game analytics, comparing their performance within each game, as well as between different games. These analytics can include performance comparisons to any cohort, any sub-group of players, or to the global player pool.

The disclosed scoring method 400 may be applied to other fields outside of trivia games. For example, in professional areas, it can be adopted to test subject knowledge of groups as well as individuals within groups. It can also be applied to forming teams and "teams of teams" with unique skills for accomplishing specific tasks.

Referring back to FIG. 2, at block 210, the method 200 includes determining a ranking of the computing devices in the game, and distributing the ranking information to the computing devices. In this step of the method 200, the one or more processors compares the cumulative scores of each of the computing devices, from the lowest score to the highest, associated with users to determine a ranking of each computing device, and distribute the ranking information, respectively, from the lowest rank to the highest. For the computing devices participating in one or more group plays within a gaming session, the one or more processors additionally or alternatively determines a ranking of the computing devices within each group and distributes the ranking information according to the scores of the computing devices within each group. Additionally or alternatively, the one or more processors may distribute the ranking of groups against other groups. For example, a group of users affiliated with the same city may compete in a gaming session against users from other cities, and/or to compete against each other for a winner within the city.

In addition to the user ranking, the one or more processors may provide other user score statistics, such as a percentage of users with scores higher than a particular user's score, and/or a percentage of users with scores lower than the particular user's score.

At block 210, the one or more processors may provide the respective ranking to each computing device as soon as the ranking is determined. Alternatively, before distributing the ranking, the one or more processors may add a delay between a time when the ranking is determined and a time when the ranking is provided to each computing device and transmit the ranking after the delay. Introducing the delay is emulating the experience of another environment, such as the experience of awaiting the decision of a live jury.

The one or more processors of the system 100 may calculate the delay based at least in part on, for example, an amount of time elapsed since the beginning of the gaming session, a number of questions or interactive content distributed since the beginning of the gaming session, the number of computing devices that provided a correct response to a question, or the coefficient of difficulty of the particular question after which the one or more processors determines the ranking. Depending on an implementation, the one or more processors may calculate the delay as a linear or a non-linear function of any combination of the above listed parameters. In one example embodiment, the one or more processors increments the value of the delay as a linear function of the number of questions distributed since the beginning of the gaming session. For example, after the first question, the added delay is zero milliseconds, 100 milliseconds after the second question, 200 milliseconds after the third question, and so on. Alternatively, the one or more processors may assign a delay as a linear function of the question difficulty coefficient, where a set value of 100, 200, or 500 milliseconds is multiplied by the question difficulty coefficient. As another example, the delay is a set value of 100, 200, or 500 milliseconds raised to the power of the question difficulty coefficient. In yet another embodiment, the one or more processors may determine the delay as a function of both the number of questions distributed since the beginning of the gaming session and the question difficulty coefficient. For example, in a function that generates the amount of delay in milliseconds, the one or more processors may increment the base by a predetermined number that depends linearly on the number of distributed questions (such as, 100, 200, 300, and so on), and raise the base to the power of the question difficulty coefficient. In yet another embodiment, the system 100 may generate the delay based on the average time elapsed since the distribution of the interactive content and receipt of the responses from the user computing devices, where the delay is a linear or an exponential function of this value.

In an alternative embodiment, at block 210, the one or more processors may first provide, to each computing device, the score value or the coefficient of difficulty of the particular question, and the number or percentage of users who provided the correct response. Then, after a delay, the one or more processors may distribute, to each computing device, the correct response for the particular question, and a respective indication whether a computing device provided a correct response.

Figure 5:
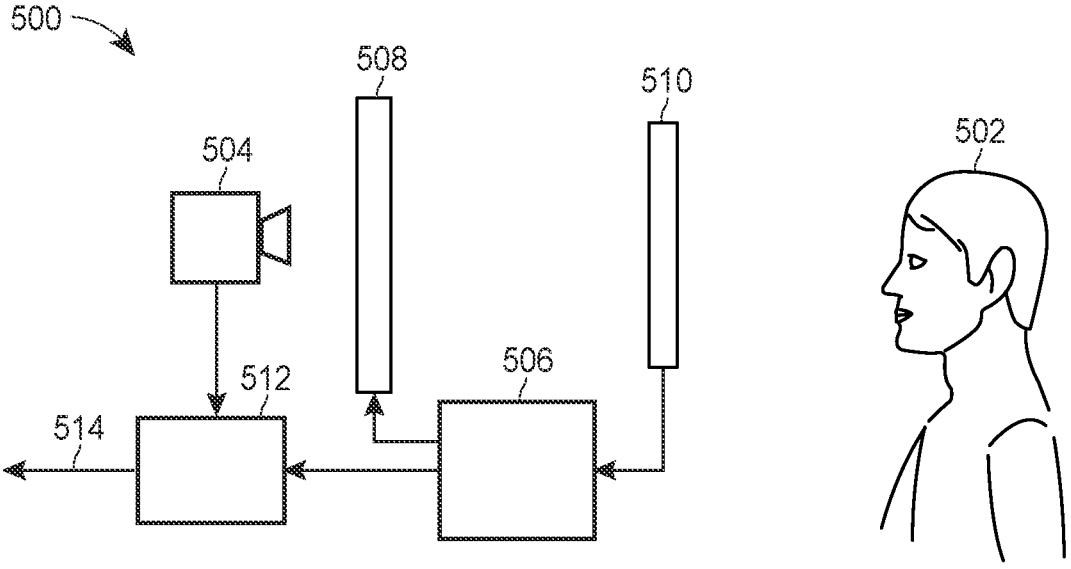
FIG. 5 illustrates a block diagram of an example system for capturing an image of a game show participant, with an overlay of questions and answers as they are viewed by the game show participant.

FIG. 5 illustrates a block diagram of an example system 500 for capturing an image of a game show participant 502, with an overlay of questions and answers as they are viewed by the game show participant. The in-studio game show participants may be captured on video for the duration of the whole game session, or if their cumulative score is ranked above a certain threshold. The threshold may be set, for example, to select the leading score on the leaderboard, or the top three scores on the leaderboard. In an embodiment, the video acquisition device(s) 166 include components of the system 500. For example, the memory 104 of the game show computing systems 102 may store the video processing module 108 with a set of instructions, that, when executed by the processor 110 may enable at least some of the operation and the functionality of the system 500.

Alternatively, the memory 162 of the video server(s) 156 may store the video processing module 164 with a set of instructions, that, when executed by the processor 110 may enable at least some of the operation and the functionality of the system 500. The method 500 is discussed with simultaneous reference to FIGS. 1 and 2, although this is for ease of illustration purposes only.

In an embodiment, the system 500 includes several subsystems of components that enable the system 500 to generate a video data signal that produces an image of the game show participant 502 looking and interacting with the image of the interactive component distributed to the computing device of the game show participant 502 by the method 200 from the viewpoint of the interactive component. The system 500 produces a frontal view of the game show participant 502 capturing the head, eye, and hand movements of the game show participant 502 with a reference of these movements to the interactive component, i.e. seeing on the captured video image what part of the interactive component the gaze of the game show participant is directed to, and what interactive component the game show participant may be selecting with their hand. In an embodiment, the system 500 may utilize an eye tracking sensor technology, and mark the image of the overlaid interactive content to further indicate the exact focus of the gaze of the game show participant 502. For example, the mark may distinguish the relevant interactive content with a different color, or draw a shape around the relevant content, or a contour, etc.

The system 500 includes a video camera 504. An interactive content image generating system 506 generates an image of the interactive content in the line of view of the camera 504. An interactive content image projecting system 508 of the system 500 projects the image of the interactive content to the game show participant 502. Example components of the interactive content image projecting system 508 will be discussed below with reference to FIGS. 6 and 7 below.

An input-output system 510 enables the game show participant 502 to interact with the interactive content displayed at the system 508. For example, the input-output system 510 may be a transparent touch screen, or an input-output device such as a mouse, a keyboard, a joystick, a game console, gloves for interacting with a virtual environment, body movement sensors, a microphone, or any other suitable means for interacting with a digitally displayed content. System 512 of the system 500 includes a means for combining, or overlaying, a video image of the game show participant 502 captured at the video camera 504, interacting, via the system 510, with an image of the interactive content as it was viewed by the game show participant 502, displayed at the system 508. The interactive content may be projected either without a background, on a transparent background, or the background may be subtracted by processing the overlaid image by the system 512. The output signal (514) of the system 500 may be transmitted, via the network 130, to the user devices 132, or any other suitable devices communicatively coupled to the network 130.

Figure 6:
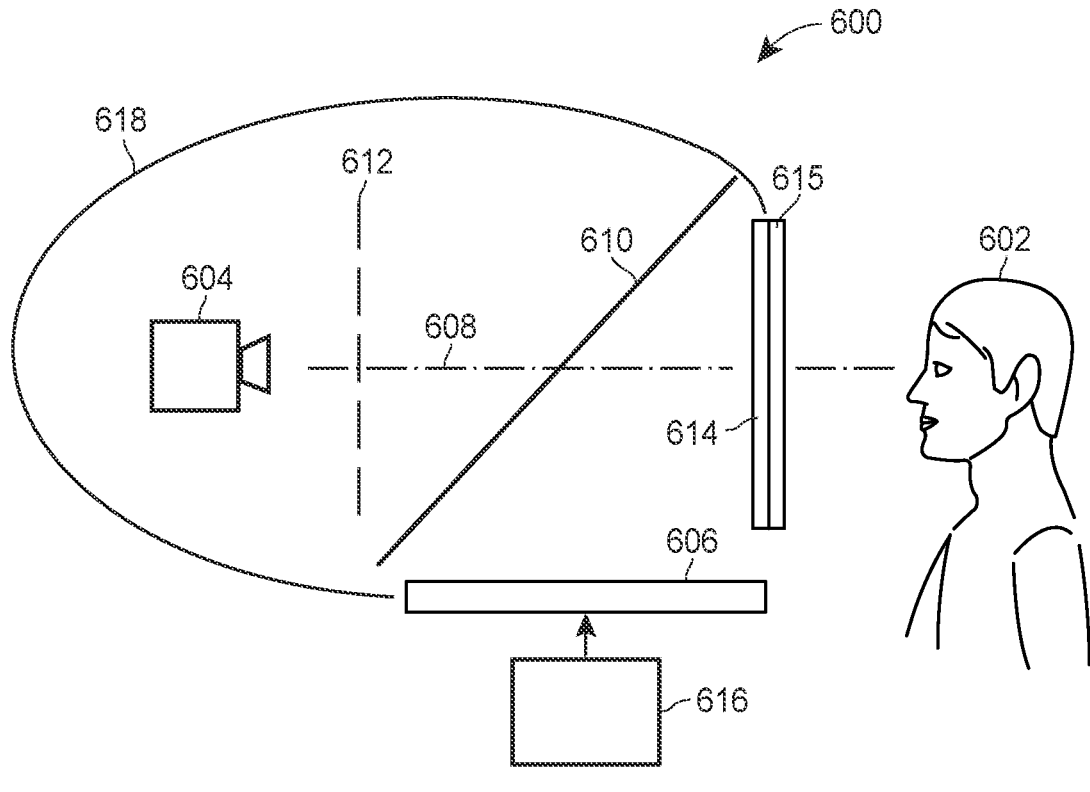
FIG. 6 illustrates a block diagram of an example system for presenting the screen with displayed questions and answers to a game show participant, and for capturing the participant's image in frontal view.

FIG. 6 illustrates a block diagram of an example embodiment of an interactive content image projecting system 600 for presenting a screen with displayed questions and answers to a game show participant 602, and for capturing the participant's image in frontal view. For example, the memory 104 of the game show computing systems 102 may store the video processing module 108 with a set of instructions, that, when executed by the processor 110 may enable at least some of the operation and the functionality of the system 600. Alternatively, the memory 162 of the video server(s) 156 may store the video processing module 164 with a set of instructions, that, when executed by the processor 110 may enable at least some of the operation and the functionality of the system 600. The method 600 is discussed with simultaneous reference to FIGS. 1, 2, and 5, although this is for ease of illustration purposes only.

The system 600 includes a screen 606. In an example embodiment, the screen 606 is a screen of a computing device communicatively or electronically coupled with the game show computing systems 102 or the game server(s) 116. The screen 606 may be the screen of a computer monitor, or a touchpad that displays an image of the interactive content, the image generated by an interactive content image generating system 616, the interactive content generated by the method 200. The interactive content image generating system 616 may be similar to the interactive content image generating system 506 of the system 500. The video camera 604 captures an image of the game show participant 602 on a line of view 608, where the line of view 608 connects the line of sight of the game show participant 602 and the field of view of the video camera 604. The video camera 604 may be similar to the video camera 504 of the system 500. The position of the screen 606 is outside the view of the video camera 604, and outside of the line of view 608. The line of view 608 is intersected by a reflective surface 610 (for example, a glass, a semi-translucent mirror, etc.) that forms a reflection, or a virtual image on a plane 612. In an embodiment, the plane 612 is perpendicular to the line of view 608. In alternative embodiments, the plane 612 is positioned within a margin of 90 degrees to the line of view 608, for example between 80 and 100 degrees to the line of view 608. It must be noted that the reflected image of the screen 606 might become inverted, which would depend on the position of the reflective surface 610. The one of more processors may correct for the inversion effects by manipulating the image displayed at the screen 606.

The system 600 may include a cover 618, which provides a dark non-reflective cover over the camera 604, the screen 606, the reflective surface 610, and the virtual image plane 612 components of the system 600, improving resolution of the virtual image on the plane 612 for the game show participant 602. The system 600 may include a sensory input-output system 614, similar to the input-output system 510 of the system 500, enabling the game show participant 602 to interact with the interactive content displayed at the plane 612. The input-output system 614 may include a system 615 for illuminating the face of the game show participant 602. For example, the system 615 may include light emitting diodes, positioned along the perimeter of the sensory input-output system 614.

Figure 7:
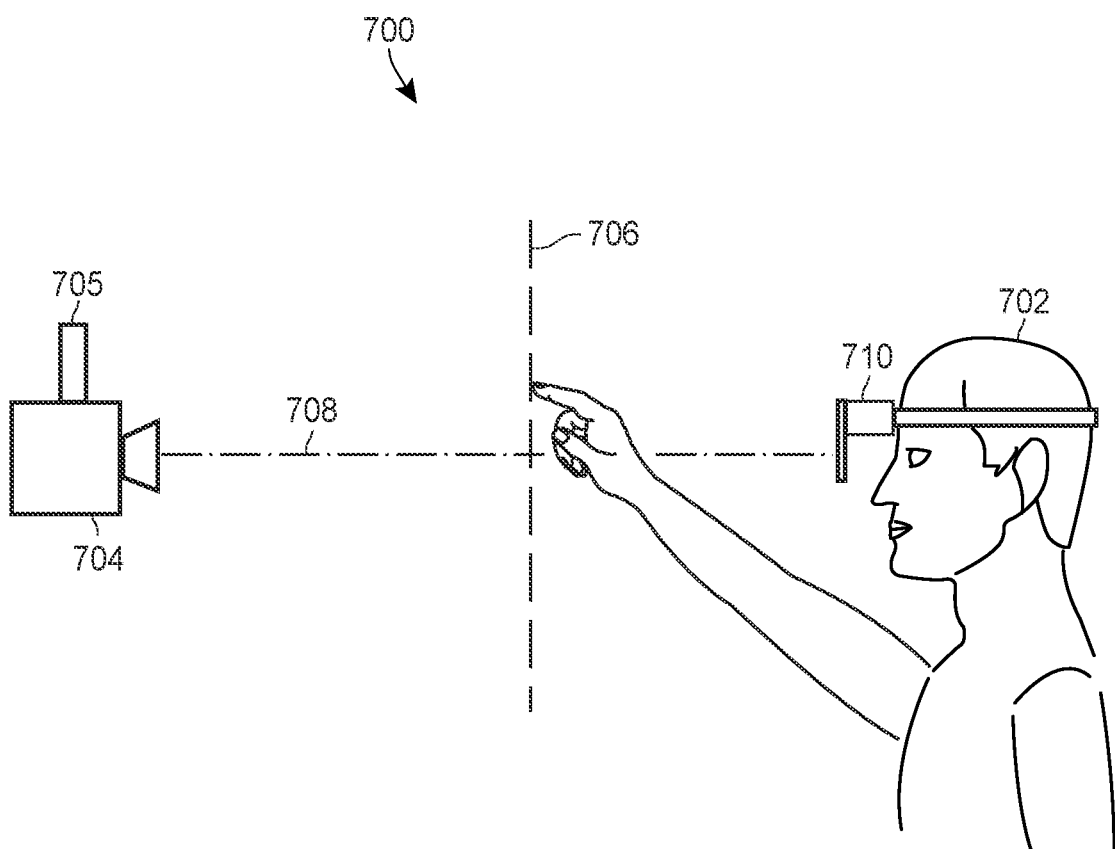
FIG. 7 illustrates a block diagram of an example system for capturing an image of a game show participant wearing augmented reality glasses.

FIG. 7 illustrates a block diagram of an example system 700 for capturing an image of a game show participant wearing augmented reality glasses. For example, the memory 104 of the game show computing systems 102 may store the video processing module 108 with a set of instructions, that, when executed by the processor 110 may enable at least some of the operation and the functionality of the system 700. Alternatively, the memory 162 of the video server(s) 156 may store the video processing module 164 with a set of instructions, that, when executed by the processor 110 may enable at least some of the operation and the functionality of the system 700. The method 700 is discussed with simultaneous reference to FIGS. 1 and 5, although this is for ease of illustration purposes only.

The system 700 may include a camera 704, capturing a video image of a game show participant 702. The camera 704 may be similar to the camera 504 of the system 500. FIG. 7 illustrates an alternative implementation of components of the system 500, where the interactive content image projecting system 508 may be implemented as a virtual projection 706 of augmented reality glasses 710, worn on a head of a game show participant 702. The augmented reality glasses 710 may be a mixed reality device, or a device employing waveguide technology, or any suitable near-eye display augmented reality device with see-through glasses, allowing to see the game show participant's face, and projecting the game interactive component in the field of view of the game show participant. The line of view 708, similar to the line of view 608 of the method 600, connects the line of sight of the game show participant 702 and the field of view of the video camera 704. For a more accurate positioning of the virtual projection 708 of the interactive content image on the line of view 708, the video camera 704 may contain a marker of augmented reality 705. Alternatively, accurate positioning of the virtual projection 708 in the line view of the camera 704 may be provided by 6DOF positioning of the augmented reality glasses 710 in space.

Combining an online gaming community and an in-studio game show group presents other advantages, for example enabling differentiation of game rewards to the different communities and sub-groups within the communities. For example, some remote users may choose to pay a participation fee, which would make them eligible for a competition within the game for an additional monetary prize pool created from the collected participation fees. In this case, game organizers may retain a portion of the participation fees for administrative expenses, for example 10 or 20 percent of the pool. It must be noted that this sub-group of players may participate in the same game as all the other contestants, their results may be used to calculate the coefficient of difficulty of each question for all the players, and they would compete against all the other players. Additionally, their score may be re-calculated between the contestants for the participation fee prize pool, or their scores from the game leaderboard would be separately compared against the other for-fee players. These players may have a chance at winning both the participation fee prize pool, and the main game prize. The participation fee prize pool may also be matched or supplemented by a game sponsor or sponsors, which would further increase the incentive for remote players to join in this contest within the game, and generate additional revenue for the game.

Since the game may be more challenging for the in-person studio players than for the remote players, there might be two different reward scales for the two different groups, and accordingly two different prize pools. When answering a question, the studio players would have to rely solely on their own knowledge, they would not have access to any external resources, where the same cannot be guaranteed for remote players. Therefore, a high cumulative score or a high cumulative score rank in the studio may be valued higher and may receive a higher reward.

What is claimed is:

1. A method in a computing system for facilitating a multi-player game play, the method comprising:

selecting, by processing hardware, a group of computing devices based on at least one selection criterion, each of the computing devices operated by a respective user, including (i) generating a geofence enclosing a geographic area (ii) and selecting, from among a set of candidate devices, the group of computing devices that are disposed within the geofence and form a cluster based on geographic proximity of a critical number of the candidate computing devices within the generated geofence;

distributing, by the processing hardware via a communication network to the group of computing devices, interactive content that includes one or more questions with a set of selectable answers;

receiving, by the processing hardware from the group of computing devices, a respective response to the one or more questions;

determining, for each response, a score based on (i) whether the response is a correct response and (ii) a number of computing devices in the group from which the correct response was received;

determining, by the one or more processors, a respective ranking based at least on the corresponding score; and providing, by the one or more processors, the respective ranking to each computing device in the group.

2. The method of claim 1, further comprising:

applying user profiles to select the group from among the set of candidate devices further based on the user profiles.

3. The method of claim 1, wherein determining the score includes dividing a number of computing devices in the group from which a response was received by the number of computing devices in the group from which the correct response was received.

4. The method of claim 1, wherein determining the score further includes determining a cumulative score using prior responses received from the same computing device.

5. The method of claim 1, wherein determining the respective ranking includes re-calculating a previous ranking using the corresponding score.

6. The method of claim 1, wherein providing the respective ranking to each computing device include:

calculating a delay between a time when the ranking is determined and a time when the ranking is provided to the computing device; and transmitting the ranking after the delay.

7. The method of claim 1, further comprising:

determining a duration of an interactive session during which the interactive content including a plurality of questions is distributed;

wherein calculating the delay is based at least in a part on an amount of time elapsed since the beginning of the session.

8. A system comprising one or more processors and a storage medium storing instructions which, when executed by the processor, causes the system to:

select a group of computing devices based on at least one selection criterion, each of the computing devices operated by a respective user including (i) generate a geofence enclosing a geographic area (ii) and select, from among a set of candidate devices, the group of computing devices that are disposed within the geofence and form a cluster based on geographic proximity of a critical number of the candidate computing devices within the generated geofence;

distribute, via a communication network to the group of computing devices, interactive content that includes one or more questions with a set of selectable answers;

receive, from the group of computing devices, a respective response to the one or more questions;

determine, for each response, a score based on (i) whether the response is a correct response and (ii) a number of computing devices in the group from which the correct response was received;

determine a respective ranking based at least on the corresponding score; and provide the respective ranking to each computing device in the group.

9. The system of claim 8, wherein the system is further configured to:

apply user profiles to select the group from among the set of candidate devices further based on the user profiles.

10. The system of claim 8, wherein the system is further configured to:

apply user profiles to select the group from among the set of candidate devices further based on the user profiles.

11. The system of claim 8, wherein to determine the score, the system is further configured to:

divide a number of computing devices in the group from which a response was received by the number of computing devices in the group from which the correct response was received.

12. The system of claim 8, wherein to determine the score, the system is further configured to:

determine a cumulative score using prior responses received from the same computing device.

13. The system of claim 8, wherein to determine the respective ranking, the system is configured to:

re-calculate a previous ranking using the corresponding score.

14. The system of claim 8, wherein to provide the respective ranking, the system is configured to:

calculate a delay between a time when the ranking is determined and a time when the ranking is provided to the computing device; and transmit the ranking after the delay.

15. The system of claim 8, further configured to:

determine a duration of an interactive session during which the interactive content including a plurality of questions is distributed;

wherein calculating the delay is based at least in a part on an amount of time elapsed since the beginning of the session.

16. A machine-readable medium carrying machine readable instructions, which when executed by one or more processors, causes the one or more processors to:

select a group of computing devices based on at least one selection criterion, each of the computing devices operated by a respective user including (i) generate a geofence enclosing a geographic area (ii) and select, from among a set of candidate devices, the group of computing devices that are disposed within the geofence and form a cluster based on geographic proximity of a critical number of the candidate computing devices within the generated geofence;

distribute, via a communication network to the group of computing devices, interactive content that includes one or more questions with a set of selectable answers;

receive, from the group of computing devices, a respective response to the one or more questions;

determine, for each response, a score based on (i) whether the response is a correct response and (ii) a number of computing devices in the group from which the correct response was received;

determine a respective ranking based at least on the
   corresponding score; and provide the respective ranking to each computing device
   in the group.

\*   \*   \*   \*   \*